UNITED STATES PATENT OFFICE.

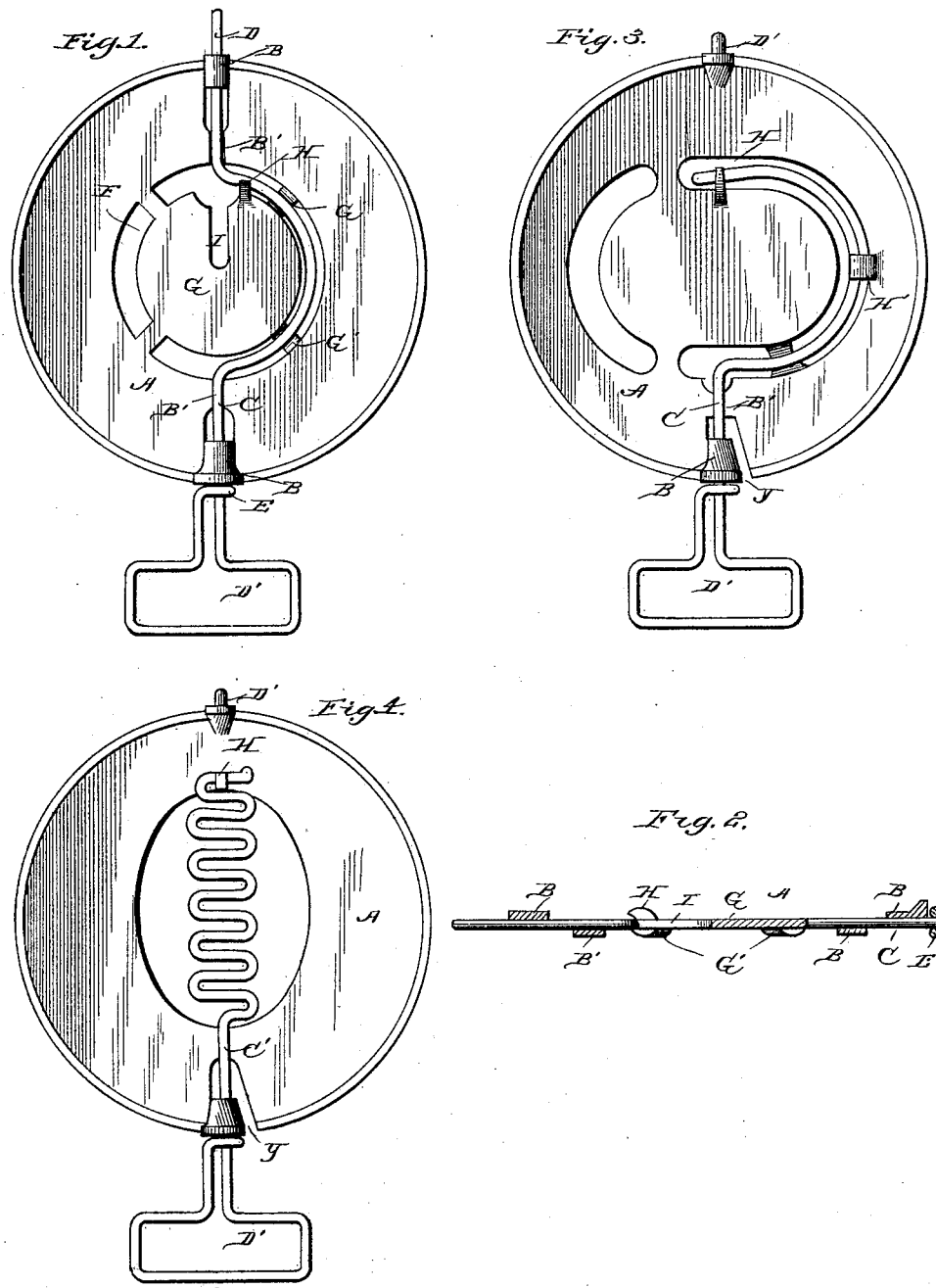

GEORGE W. WARNER, OF FREEPORT, ILLINOIS, ASSIGNOR TO THE WARNER MANUFACTURING COMPANY, OF SAME PLACE.

DAMPER.

SPECIFICATION forming part of Letters Patent No. 452,739, dated May 19, 1891.

Application filed October 10, 1890. Serial No. 367,657. (No model.)

*To all whom it may concern:*

Be it known that I, GEORGE W. WARNER, a resident of Freeport, in the county of Stephenson and State of Illinois, have invented certain new and useful Improvements in Dampers; and I do hereby declare the following to be a full, clear, and exact description of the invention, such as will enable others skilled in the art to which it pertains to make and use the same.

My invention is an improved damper having a spring-wire handle in detachable engagement with the plate, such engagment depending upon the elastic force of a spring formed in the shank itself entirely within the line of the plate's margin.

In the drawings, Figure 1 is a plan of the damper. Fig. 2 is a section on the line 2 2, Fig. 1. Figs. 3 and 4 show slight modifications of construction.

In Figs. 1 and 2, A is a damper-plate, having upon opposite sides the usual rod-bearings, each formed by depressing parts B B' from opposite faces of the plate and cutting away the metal intervening between the parts so depressed. In the bearings so formed lies an elastic rod C, whose ends project beyond the damper-plate to form at one end a gudgeon D and at the other a handle D', having a shoulder E contiguous to the edge of the plate. The central portion of the plate is cut away at F for the usual purpose; but the opening is in this case made nearly annular, the central part G being connected to the outer portion by bridges G', preferably curved out of the plane of the plate. That portion of the wire between the bearings is curved laterally to a radius a little greater or less than that of the opening, which is overhung at one side of the line of the bearings by a projection H. The central part of the plate is slotted at I. Now the rod, being inserted through the plate between the two parts of the bearing nearest the handle, is swung over until its free end rests in the slot and in the inner half of the corresponding bearing and pushed beneath the outer half until the shoulder E meets the edge of the plate. The wire being then sprung into engagement with the projection H, it can neither be withdrawn nor rotated independently of the plate. Thus far it is immaterial whether the projection be upon the central or the outer portion of the plate, the curvature of the wire being such that it must be sprung to pass beneath it; nor is it essential that the wire be extended to form the gudgeon opposite the handle, the operation being substantially the same if the gudgeon be cast upon the plate, as in Fig. 3. In the latter case, however, there should be a second projection H' at some distance from the first, beneath which the wire may be passed before springing it beneath the latter. To secure an additional result, however, it is important that the spring be extended instead of compressed in passing into position, for if it be extended and if its normal form be such that it still tends to recoil after falling into place its elastic force draws the shoulder E against the edge of the plate or against the pipe if it be in position therein, and thus accidental rotation of the damper is prevented without externally visible means, a second result not interfering with that first set forth.

The form of the spring is not necessarily a single circular curve; but it may be a series of curves forming a spiral or a sinuous line, as in Fig. 4.

To facilitate placing the handle in position, the plate may be provided with a slot leading from its margin to the space between the parts of the bearing next the handle, as shown at Y, Fig. 3.

What I claim is—

1. The combination, with a damper-plate having a shank bearing at one side or edge, of a handle-shank lying in said bearing, detachably secured to the plate at some distance from the bearing and having its intermediate portion bent into a spring to act in the general direction of the shank's length, substantially as and for the purpose set forth.

2. The combination, with the damper-plate having upon one side the bearing for the damper-shank and at some distance therefrom the projection to be engaged thereby, of the spring-wire shank lying in said bearing and engaging said projection, said shank being bent from a direct course between said bearing and projection to form a spring, substantially as and for the purpose set forth.

3. The combination, with the plate having the bearings upon the opposite sides, the annular opening spanned by the curved bridges, the lug projecting over the opening, and the slot in the portion within the opening, of the spring-wire lying in said bearings and projecting to form the gudgeon, and the handle having a shoulder contiguous to the plate, said wire being bent laterally between the bearings to form a spring and then sprung beneath said projection.

In testimony whereof I have signed this specification in the presence of two subscribing witnesses.

GEORGE W. WARNER.

Witnesses:
F. R. BARTLETT,
FREDERIC BARTLETT.